US009292725B2

(12) United States Patent
Salvi et al.

(10) Patent No.: US 9,292,725 B2
(45) Date of Patent: Mar. 22, 2016

(54) METHOD AND SYSTEM FOR DETECTING 2D BARCODE IN A CIRCULAR LABEL

(71) Applicant: bioMérieux, Marcy l'Etoile (FR)

(72) Inventors: Guido Salvi, Vaiano (IT); Andrea Carignano, Pistoia (IT); Silvano Scaccabarozzi, Missaglia (IT); Davide Visconti, Cornate d'Adda (IT)

(73) Assignee: bioMérieux, Marcy l'Etoile (FR)

( * ) Notice: Subject to any disclaimer, the term of this patent is extended or adjusted under 35 U.S.C. 154(b) by 0 days.

(21) Appl. No.: 14/428,761

(22) PCT Filed: Sep. 19, 2013

(86) PCT No.: PCT/EP2013/069460
§ 371 (c)(1),
(2) Date: Mar. 17, 2015

(87) PCT Pub. No.: WO2014/044747
PCT Pub. Date: Mar. 27, 2014

(65) Prior Publication Data
US 2015/0278571 A1    Oct. 1, 2015

(30) Foreign Application Priority Data
Sep. 21, 2012   (EP) ..................................... 12185478

(51) Int. Cl.
*G06K 7/10*    (2006.01)
*G06K 7/14*    (2006.01)
*G06K 19/06*   (2006.01)

(52) U.S. Cl.
CPC ............ *G06K 7/1443* (2013.01); *G06K 7/1417* (2013.01); *G06K 7/1456* (2013.01); *G06K 19/06037* (2013.01)

(58) Field of Classification Search
CPC ............... G06K 19/06028; G06K 2019/06243
USPC ............................................. 235/462.03, 494
See application file for complete search history.

(56) References Cited

U.S. PATENT DOCUMENTS

| 5,798,514 | A  | * | 8/1998  | Domanik ................. 235/462.03 |
| 7,398,928 | B2 | * | 7/2008  | Gaspard et al. .......... 235/462.03 |
| 7,571,864 | B2 | * | 8/2009  | Kiliccote ..................... 235/494 |
| 2005/0269412 | A1 | * | 12/2005 | Chiu et al. ............... 235/462.03 |
| 2006/0269136 | A1 |   | 11/2006 | Squires et al. |

FOREIGN PATENT DOCUMENTS

EP    1143372 A2    10/2001

OTHER PUBLICATIONS

Jacobs, Peter, "International Search Report," prepared for PCT/EP2013/069460, as mailed Jan. 15, 2014, three pages.

* cited by examiner

*Primary Examiner* — Seung Lee
(74) *Attorney, Agent, or Firm* — Winstead PC

(57) ABSTRACT

The present disclosure relates to a method and system for identifying and reading a barcode on a circular label. Such method and system, in the embodiment discussed, is concretely addressed to a specific example in the engineering of a barcode reader in an electromechanical system for biological analyzes which uses cone-shaped tubes and corresponding strips of fluid containers. It is a requirement of the system that the right cone matches with the right strip. In order to avoid any human error, barcode reading system is implemented, by placing a barcode (e.g. a 2D barcode) on the cone-shaped tube and a barcode on the strip: however the particular shape of the cone poses some problems in the automatic localization and reading of the barcode on the circular label on top of the cone. An additional difficulty of the present system is that of the inclination of barcode reader with respect to the circular label carrying the code, due to the relative positioning of the various components of the machine which does not allow a straight alignment between the reader and the target. With the method according to a preferred embodiment of the present disclosure the circular label is scanned to detect the 2D barcode and it is then read, with a simplified algorithm requiring limited power and hardware resources.

12 Claims, 19 Drawing Sheets

Fig. 4A
Fig. 4B
*Fig. 4*

Fig. 5 A
Fig. 5 B
*Fig. 5*

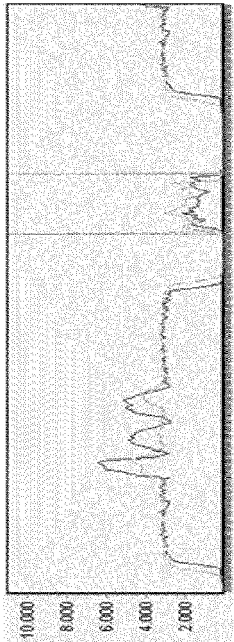
Fig. 10 B
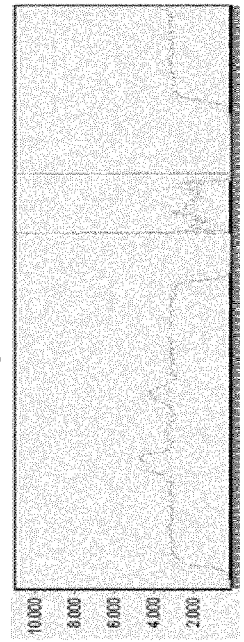
Fig. 10 D
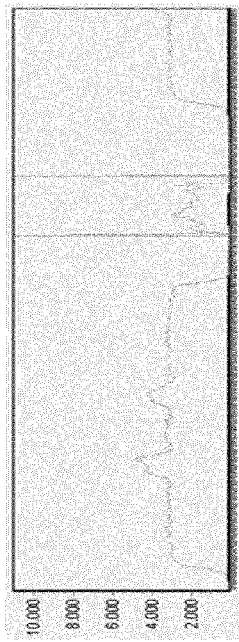
Fig. 10 F
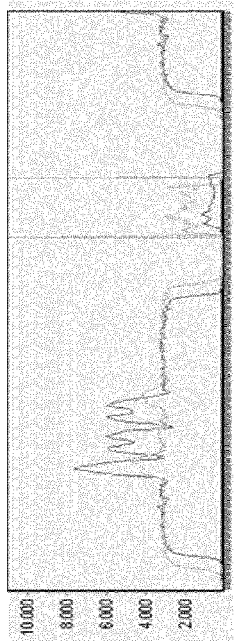
Fig. 10 A
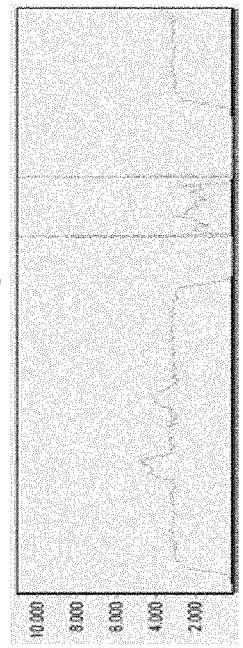
Fig. 10 C
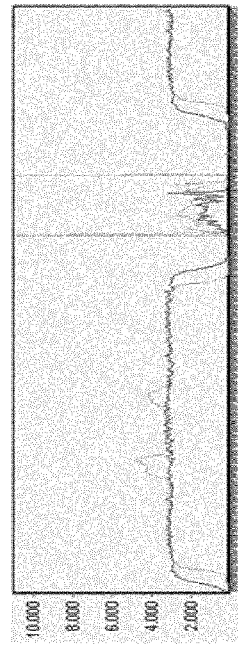
Fig. 10 E
*Fig. 10*

| GREY LEVEL | X0 | X1 | X2 | X3 | X4 | X5 | X6 | X7 |
|---|---|---|---|---|---|---|---|---|
| Y0 | 200 | 205 | 190 | 180 | 130 | 60 | 20 | 25 |
| Y1 | 205 | 207 | 188 | 175 | 129 | 61 | 22 | 23 |
| Y2 | 203 | 204 | 191 | 178 | 132 | 59 | 19 | 24 |

*Fig. 14*

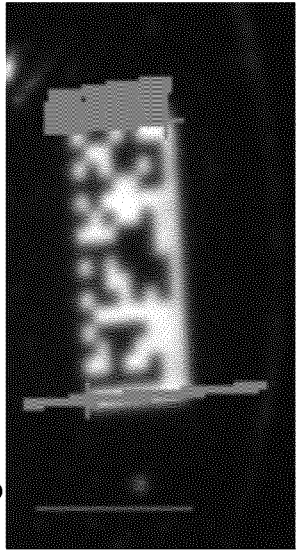
Fig. 18 B
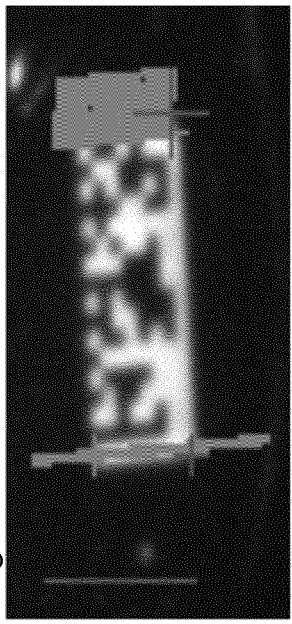
Fig. 18 C
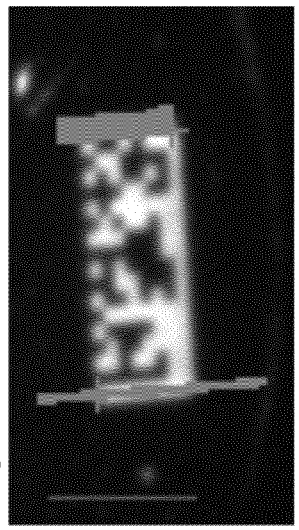
Fig. 18 A
*Fig. 18*

METHOD AND SYSTEM FOR DETECTING 2D BARCODE IN A CIRCULAR LABEL

FIELD OF TECHNOLOGY

The present invention relates to a method and system for barcode reading. In particular the present invention relates to a method and system for localizing a barcode (e.g. a 2D barcode) placed on a circular region, particularly on a circular label.

BACKGROUND

The problem of scanning barcodes can be applied to a large variety of application contexts, in the present application, without loss of generality, we concretely address a specific example in the engineering of a barcode reader in an electromechanical system for biological analyses. In particular, the barcode reading system has been implemented in the The Vitek ImmunoDiagnostic Assay System manufactured and distributed by bioMerieux also known as VIDAS® or VIDAS® 3 in its more recent version. It is a compact automated multiparametric immunoanalyzer that uses predispensed disposable reagent strips and specially coated Solid Phase Receptacles (SPR®). The VIDAS® 3 can pipette directly from the primary sample tube, mix, incubate, control and analyze samples.

The VIDAS® 3 has four independent sections, where each section can run up to 3 samples. Additional features allow the VIDAS® 3 to perform sample handling from primary tubes automatically. The operator introduces the centrifuged, uncapped tubes, SPR® and strips into the instrument. All remaining operations (barcode reading of the primary tubes and sample aspiration from primary tubes) are handled by the system automatically. VIDAS® 3 reagent strip processing, algorithms, analysis and kit components used (strips, SPR®, etc.) are all identical to the current VIDAS® and mini VIDAS®. Like the VIDAS® and mini VIDAS®, the VIDAS® 3 will offer routine batch or random access (mixed) testing for serology, immunochemistry, antigen detection and immunohemostasis. The immunological methods are indirect EIA, immunocapture, sandwich or competition, all involving a conjugate using the alkaline phosphatase. Like the VIDAS® and mini VIDAS®, the VIDAS® 3 uses instrument protocols as defined for each assay product. These protocols are automatically selected in the computer knowledge base through bar-coded information on the product packaging. The user confirms assay selection through user menus. Test results are transmitted to the computer to be analyzed and printed.

The system is able to concurrently run multiple analyses, which comprise sequences of actions performed on the sample by shared mechanical components; the maximum duration of each analysis is limited by biological constraints, but waiting times between subsequent actions are allowed to range in a non-deterministic interval.

Each type of biological analysis is comprised by a pretreatment phase and an analytic protocol. At the beginning of the analysis, a cone shaped test-tube uniquely identified by a barcode contains the sample, other tubes arranged as a strip of multiple containers, contain dilution and incubation fluids. During the pretreatment phase, an automatic pipettor repeatedly pours off the sample among the various tubes; each pipettor action lasts for a deterministic amount of time. Waiting times are allowed between successive actions, but they are constrained to range between minimum and maximum values determined by incubation/reaction periods and sample deterioration properties. After completion of the pretreatment phase, the analytic protocol follows a fixed sequence of steps during which the sample is combined with reagents and multiple measurements are taken by a read-head.

Also in this case, read-head actions are deterministic and interleaved with waiting times (see FIG. 1). For efficient exploitation of electromechanical components, multiple analyses, also of different types, are carried out concurrently. To this end, the system composes multiple sections, one for each analysis. Each section is in turn divided in slots, carrying different samples that can be subject to different pretreatments and can operate on samples of different subjects. However, since the read-head is designed to take measures on a whole section at once, all slots in the same section are constrained to run the same analytic protocol (see FIG. 2).

The pipettor and the read-head are shared among different slots and sections and cannot be used simultaneously by two different analyses.

In such biological analyses, it is of course essential that the right cone matches with the right strip. The insertion of the cones and the strips in the machine is normally done manually by an operator. The arrangement with multiple sections and slots makes even easier making a mistake in the position of the pair cone/strip. Several methods of emphasizing the matching between the two matching components have been put in place (e.g. same color on cone and strip), in order to facilitate the operation by the human operator. However, to make sure that the analyses are performed correctly, the machine should be better provided with an automatic recognition mechanism to avoid any human error. Barcode reading seems to be one of the possible solution, with a barcode (e.g. a 2D barcode) on the cone-shaped tube and a barcode on the strip: however the particular shape of the cone poses some problems in the automatic localization and reading of the barcode on the circular label on top of the cone (see FIG. 3). Known image recognition methods and software are quite expensive in terms of resource and time consumption. An additional difficulty of the present system is the possible inclination of barcode reader with respect to the circular label carrying the code, due to the relative positioning of the various components of the machine which does not allow a straight alignment between the reader and the target.

A simplified, faster and less hardware resource consuming solution would be therefore highly desirable.

OBJECTS OF THE DISCLOSURE

It is an object of the present disclosure to overcome at least some of the problems associated with the prior art.

A further object of the present invention is to provide a method for identifying the position of a 2D barcode image on a substantially circular label in a fast and reliable way.

Another object of the invention is to provide an electromechanical apparatus for performing biological analyses having a barcode reader capable of localizing and reading a 2D barcode image on a substantially circular label.

SUMMARY

The present disclosure provides a scheduling method as set out in the accompanying claims.

According to a first embodiment, the present disclosure provides a method for determining, with a digital image processing system, the position of a rectangular data matrix within a substantially circular region, the data matrix being positioned within a predetermined portion of a circular crown region, the circular crown region being defined by an inner circle and by an outer circle having the center substantially coincident with the center of the substantially circular region, the predetermined portion of the circular crown region being identified by at least one visual mark, the method including the steps of: acquiring a digital representation of the substantially circular region; determining the center of the substantially circular region; building a detecting ring area including the inner and the outer circles; radially scanning the detecting ring area to identify the at least one visual mark indicative of the start position of the predetermined portion of the circular crown region; starting from the start position, scanning the detecting ring area to determine the position of the border of the data matrix.

In a preferred embodiment of the present disclosure the predetermined portion of a circular crown region is included in a circular segment, the minimum contrast between the circular segment and the rest of the substantially circular region exceeding a predetermined threshold and the at least one visual mark is represented by a position where the circular crown region intersects the chord defining the circular segment.

Also in a preferred embodiment, the data matrix represents a 2D barcode and the background of the circular segment where the data matrix is positioned is black. Advantageously the area covered by the circular segment is at most 90% of the total area of the substantially circular region, preferably at most 70% and more preferably at most 50%. In a more preferable manner, the area covered by the circular segment is less than 50% of the total area of the substantially circular region. One of the advantages of having a partial circular segment compared to the substantially circular region is that information other than barcode information can be included in the area different from the circular region. Another advantage lies in that a smaller circular segment facilitates its reading and thus finding the 2D barcode.

Also, in a preferred embodiment acquiring a digital representation includes capturing by means of a digital image processing system a black and white rectangular picture including the substantially circular region, the rectangular picture including an array of pixels each pixel having a level of gray and storing the representation within the digital image processing. The step of determining the center of the substantially circular region includes: identifying the edge of the substantially circular region within the rectangular picture; determining the center of the substantially circular region with respect to the identified edge. In an embodiment of the present invention, identifying the edge of the substantially circular region includes: horizontally scanning the rectangular picture to identify a transition point where the difference between the level of gray of neighboring pixels is exceeding a predetermined value, the horizontal transition point being indicative of a lateral edge of the substantially circular region; vertically scanning the rectangular picture to identify a transition point where the difference between the level of gray of neighboring pixels is exceeding a predetermined value, the vertical transition point being indicative of a vertical edge of the substantially circular region.

Advantageously the step of building a detecting ring area includes determining a circular crown included between an internal radius and an external radius with respect to the center of the substantially circular region.

According to another aspect of the present disclosure, it is provided a computer program, including program code means which, when executed on a computer, implements the above method.

According to another embodiment, we provide a system for determining, with a digital image processing system, the position of a rectangular data matrix within a substantially circular region, the data matrix being positioned within a predetermined circular crown region and within a circular segment of the substantially circular region, the circular segment having a background minimum darkness higher than a predetermined threshold, the circular crown region being defined by an inner circle and by an outer circle having the center substantially coincident with the center of the substantially circular region, the system including one or more components adapted to perform the steps of the above method.

According to a further embodiment of the present disclosure we provide a barcode reading system including the above system for determining the position of a rectangular data matrix within a substantially circular region. Also provided is an electromechanical system for performing biological analyses, including the barcode reading system.

The present invention offers a number of benefits. One of the advantages of a preferred embodiment of the present invention is that a simplified, low resource consuming image recognition software addresses the need of identifying, localizing and reading a barcode on a circular shaped label.

BRIEF DESCRIPTION OF THE DRAWINGS

Reference will now be made, by way of example, to the accompanying drawings, in which:

FIGS. 4 to 18 show various stages and aspects of the method according to a preferred embodiment of the present invention;

DETAILED DESCRIPTION OF PREFERRED EMBODIMENTS

Figure 1:
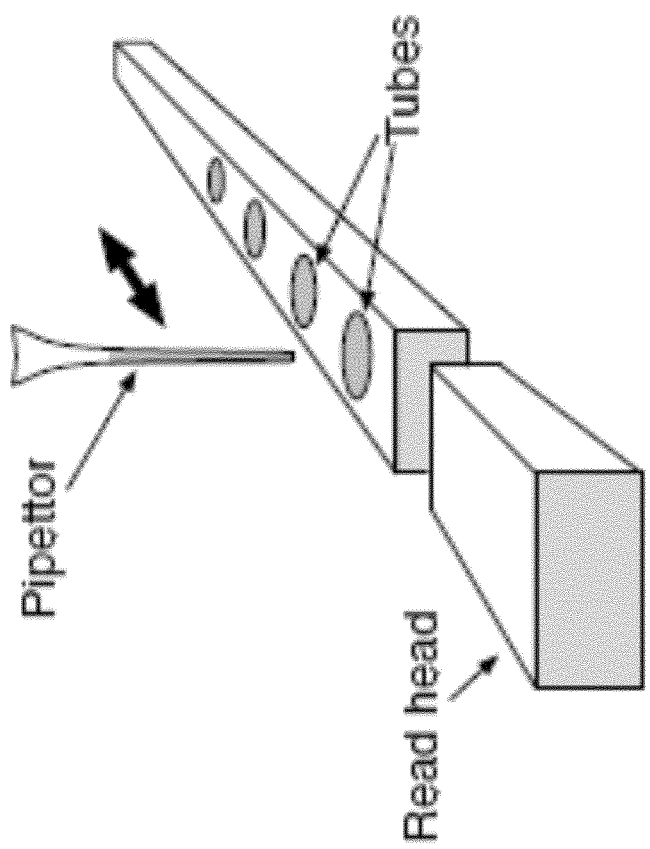
FIG. 1 is a schematic representation of the physical architecture of system components running a single analysis in an electromechanical apparatus for performing biological tests.
Figure 2:
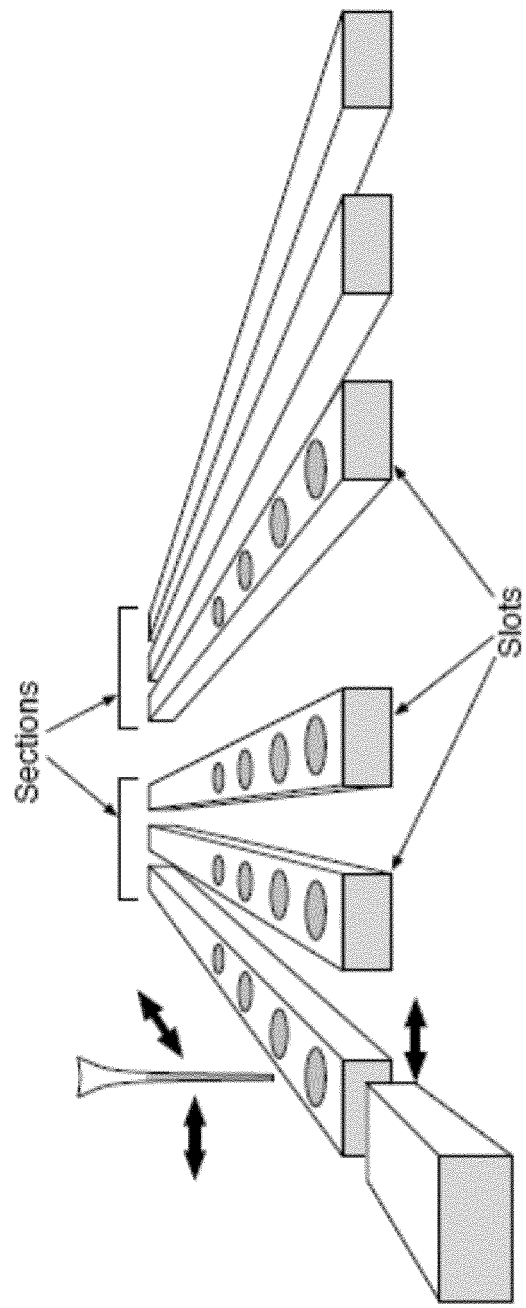
FIG. 2 is a schematic representation, of the physical architecture of the overall system composing multiple analyses in slots and sections in an electromechanical apparatus for performing biological tests according to an embodiment of the present invention.
Figure 3:
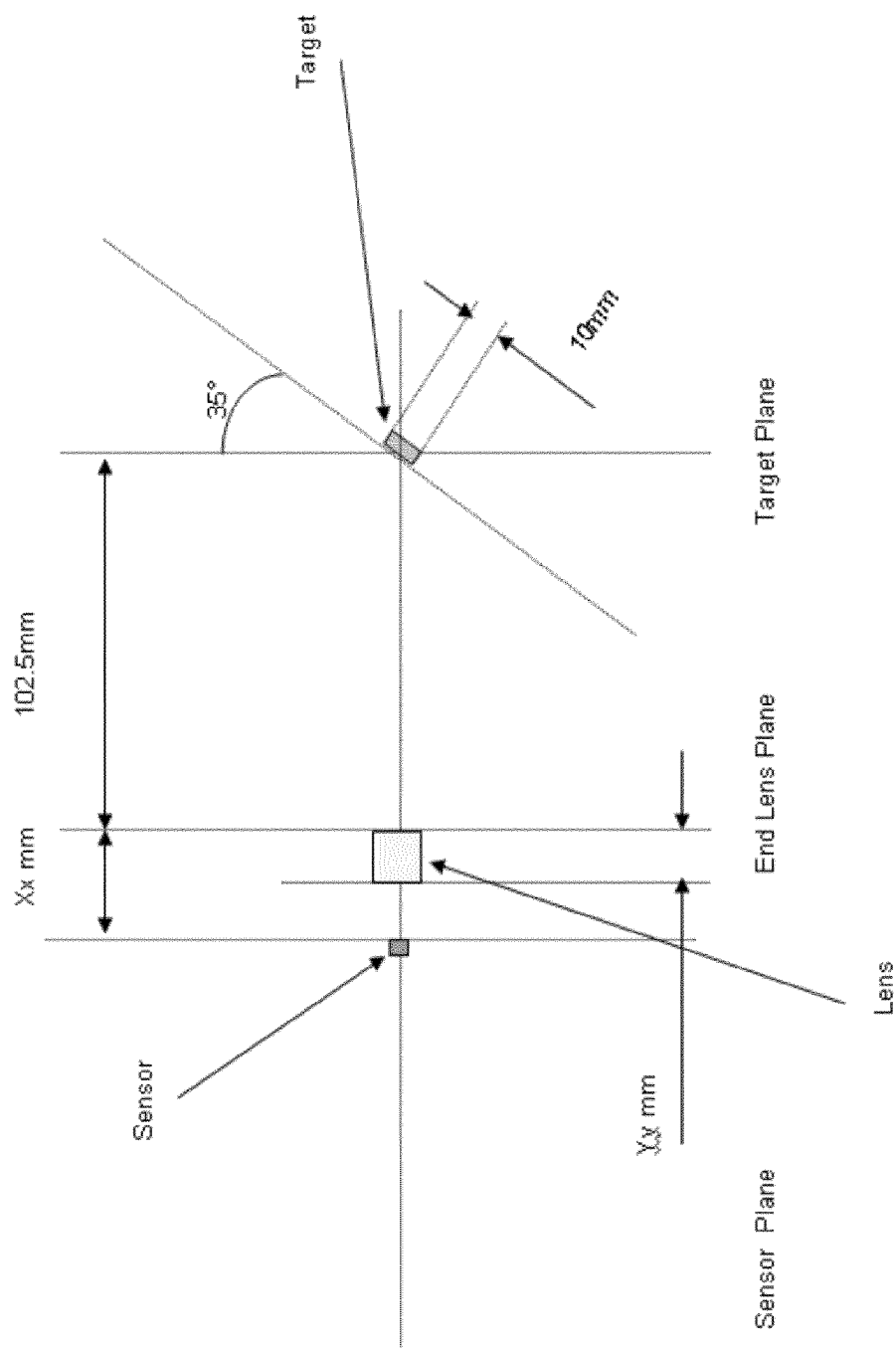
FIG. 3 is a schematic representation of the relative positioning of the detecting device and the target, which is inclined with respect to the perpendicular axis passing thorough the center of the detecting device.

The arrangement of a detecting device (e.g. a camera including a sensor 101 and a lens 103) being inclined with an angle δ (e.g. 35°) with respect to the target 105 is represented in FIG. 3. The target, in the present example, is a circular label carrying a barcode which is applied on top of a cone-shaped tube. Such tube must match with a corresponding strip as mentioned above. The task to be performed by the system which implements an embodiment of the present disclosure is to acquire the image represented on the label on target 105, localize the barcode (e.g. a 2D barcode) and read the information contained in the barcode. Such information can then be used to verify the correct matching between the cone and the strip. More generally the problem addressed by the present disclosure is that of reading a barcode on a circular label, which can possibly lie on a plane inclined with respect to the perpendicular line from the detecting device and the target. A 2D barcode is normally represented with a DataMatrix, i.e. a two-dimensional matrix consisting of black and white "cells" or modules arranged in either a square or rectangular pattern. The information to be encoded can be text or raw data.

The detecting device is controlled by a computer or microprocessor having a code embedded on firmware; e.g. in the practical example here described, the microprocessor is a processor based on an ARM9 core, running up to 400 Mhz mainly targeted for multimedia and low power applications. This processor is needed in order to provide enough capability to acquire the image and decode the DataMatrix (DMTX) code. The microprocessor is equipped with a FLASH, RAM and EEPROM memory: FLASH memory is used to store the application and the FW code; RAM memory is used to execute code and store both image information and temporary information during the DataMatrix decoding process. EEPROM memory is used to store relevant data such as parameter of the camera board or calibration data. Such computer runs a software which processes the image captured by the detecting device 101 which, in a preferred embodiment of the present disclosure, is mounted on a board. In a preferred embodiment of the present disclosure the software includes a Data Matrix Decoding Algorithm (DDA) which is able to decode a Data Matrix (DMTX) of a fixed size (e.g. code density of 8×18 squares with any single element side size of 5 mils (0.127 mm) with ECC200. ECC200 is a recent version of Data Matrix and supports advanced encoding error checking and correction algorithms. ECC200 allows the routine reconstruction of the entire encoded data string when the symbol has sustained up to 30% damage, assuming the matrix can still be accurately located. The optimal working distance, between the detecting device and the target plane is comprised between 106 mm and 98 mm, e.g. 102.5 mm as in the present example. In an embodiment of the present disclosure the board with the detecting device 101 is positioned with an angle of 35 degrees with respect to the perpendicular axis of the target plane (and the circular label).

In an embodiment of the present disclosure the detecting device includes a camera (e.g. OmniVision OV9121 B&W with a CMOS sensor 1280×1024 (SXGA), equipped with lens e.g. 16 mm standard lens. Over the lens there is a mechanical and fixed aperture that allows a greater Depth of Field (DOF). The DOF is the distance between the nearest and farthest objects in a scene that appear acceptably sharp in an image. Although a lens can precisely focus at only one distance at a time, the decrease in sharpness is gradual on each side of the focused distance, so that within the DOF, the unsharpness is imperceptible under normal viewing conditions. In the following figures we can see the aperture in action. FIG. 4A is acquired without a mechanical aperture. The focus decrease outgoing from the centre of the image: DMTX is blurred. FIG. 4B is acquired with a mechanical aperture and all the circular label (also referred to in the following as DOT) has a correct focus.

The lighting is also a critical aspect for creating a good quality, robust and timely vision inspection: the system according to a preferred embodiment of the present disclosure mounts six red LED around the lens of the camera body to illuminate the dot.

In a preferred embodiment of the present disclosure, the image recognition software will clip a portion of image to get a result picture of 512×512 pixels. For a correct analysis, the DOT must be completely internal of the area captured by the camera. FIG. 5A represents an example where the DOT is shifted to the left with respect to the expected center, while FIG. 5B shows an example where the Dot is reasonably centered.

Figure 6:
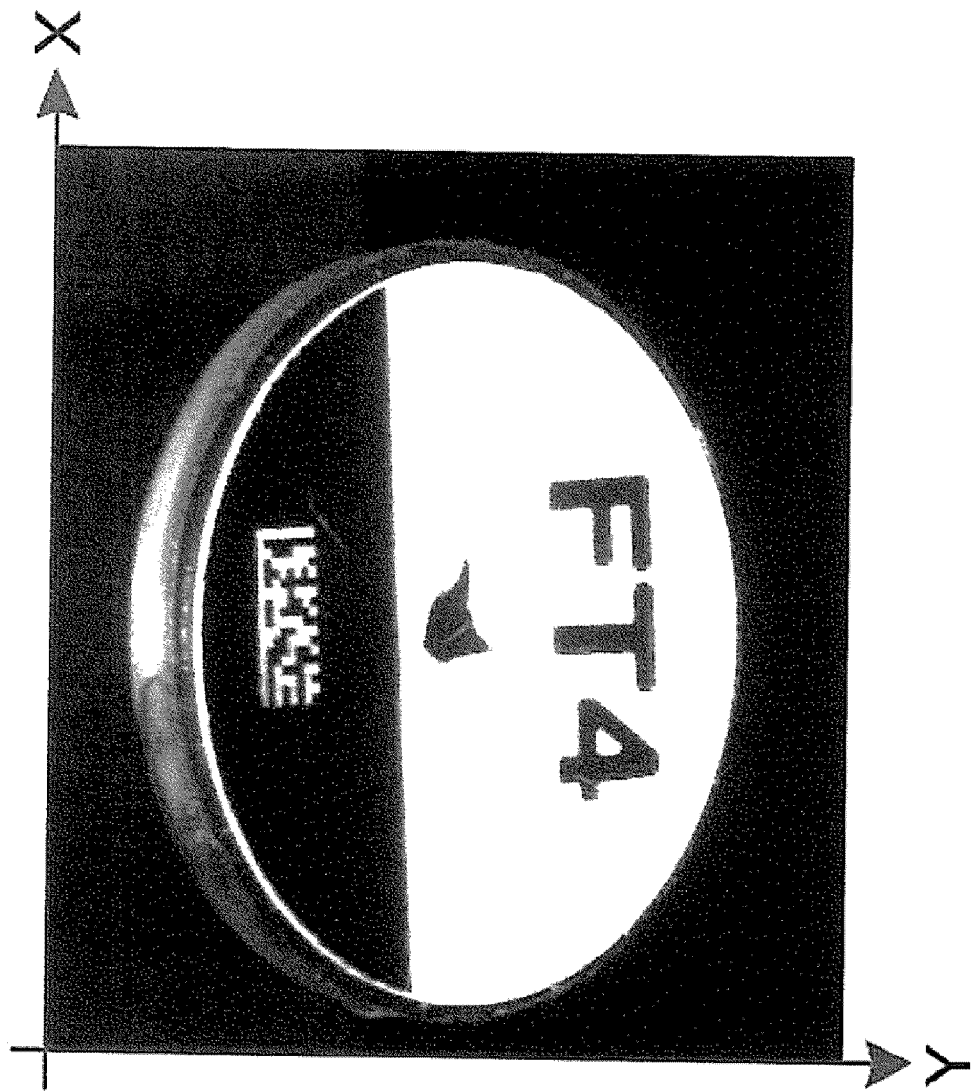

The image processing starts with the setting of a pointer at the first pixel of the image which: it corresponds to the first byte of the array (or matrix) and it's the top left on the image. There isn't any copy of the image because it costs a lot of milliseconds, about 200 msec, so the system uses directly a buffer filled by the main firmware. FIG. 6 shows the conventional direction of the XY axes in an image.

The system has a range of flexibility for correctly decode the DMTX. This range can be roughly calculated by varying the distance between the camera and DOT. In the preferred embodiment of the present example, the DOT is normally readable at the nominal distance (102.5 mm)+3 mm/−4 mm with a reading angle of about 35°. The system can correctly read DMTX at higher or lower distances but, in these cases, other variables (position, rotation, distortion, blur) could affect the final result. In vision inspection also the background is a critical aspect: the final scene must be similar to the one obtained during a setting test.

Example of setting test conditions (used in the present embodiment) is the following:
   light not greater than 150 lux;
   background out of the target (DOT) as dark and uniform as possible. According to a preferred embodiment the background can be considered as uniform if there are no zones where the detected grey level (gl) between two neighboring pixels exceeds a predetermined threshold, e.g. 10gl in case of a rising or a falling edge and 5gl in case of peaks. The terms "rising/falling edge", "peak" and "peak detection" are referred to their meaning as used in the image processing field;
   the image of the target (DOT) should be preferably substantially in the middle of the window with size 512×512 pixel; however for the algorithm to work it is enough that the whole image is within the border of the window and preferably the border of the DOT should be about 10 pixel from the border of the window.

If it changes drastically, the functionality of system could be compromised, especially in "missing dot" analysis. To find a "missing DOT", the system implements a cumulative histogram function that collects all pixel values grouped by 16 sections.
   Section 0: from 0 to 15 value of grey level.
   Section 1: from 16 to 32 value of grey level.
   Section 2: from 33 to 48 value of grey level.
and so on until
   Section 16: from 241 to 256 value of grey level.

Figure 7:
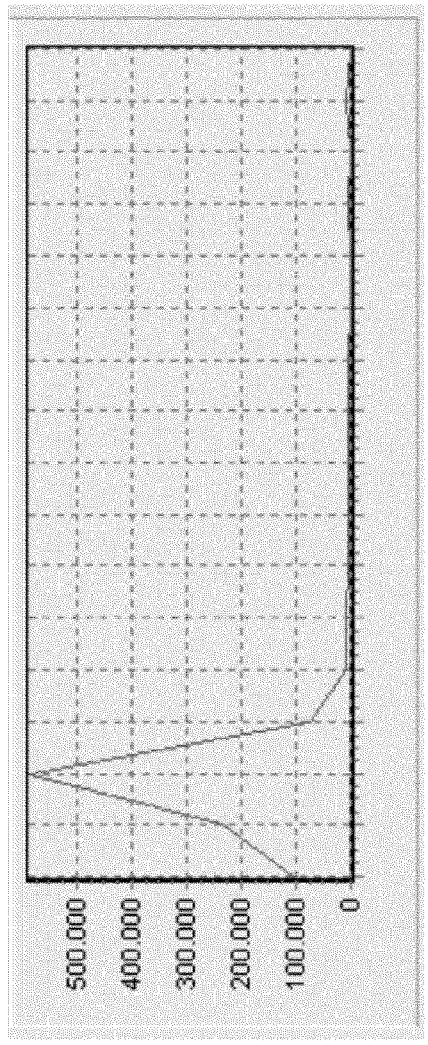
Figure 7:
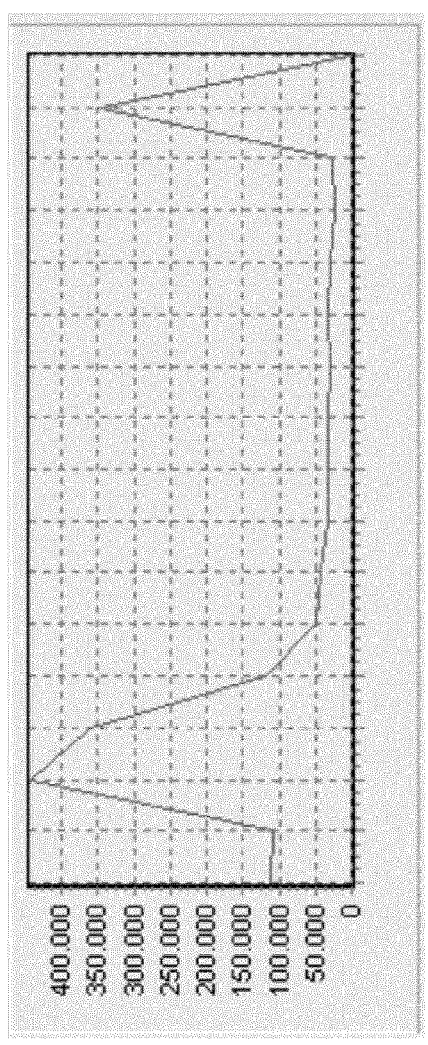

After the histogram is completed, to verify the presence of DOT it only has to compare the last one value with a threshold. FIGS. 7A and 7B are graphical representation of the histogram. FIG. 7A shows an example of missing DOT, while FIG. 7B shows an example of presence of DOT.

In order to find the DOT on the image and the position of DMTX (which is inside the DOT) the system implements a series of functions that:
   Find the DOT edge and the center of the DOT;
   Apply to the image a set of ring shaped mask (aligned respect the center of the DOT);
   Search the DMTX inside the ring selected.

A function called SearchCenterRing searches and finds the center of the DOT through 5 left profiles, 5 right profiles and a bottom diagonal scan. The profile is usually used to make an average of a specific number of pixels and this is a way to catch a better rising or falling edge.
   The first 5 left horizontal profiles search the left side of DOT.
   The second 5 right horizontal profiles search the right side of DOT.
   The last scan searches the bottom side of DOT by means of 7 radial profiles starting form the bottom of the image.
1. The system finds the left edge of DOT selecting the best profile out of 5, i.e. making the scan of 5 profiles vertically centered on the image. For each of these profiles the system integrates 5 vertical pixels for each X coordinate, starting from coordinate x=10 to the centre of the image. The 5 vertical level of gray (gl) are stored in an array to be analyzed, not comparing their values with a fixed global threshold, but in a relative way. The relative analysis is done by comparing the difference between a value I and a value (I+6) (i.e. shifted of 5 positions) with a predetermined reference absolute value. If the difference exceeds such reference value (e.g. 10gl), we assume there is an edge and therefore the left limit of the DOT. In such way we take into consideration only real edges with a minimum depth (e.g. rising edge when the transition goes from black to white or falling edge in the opposite case), excluding edges which are too thin. If edges are narrower than a predetermined threshold, the positive (or negative) transitions are immediately followed by an opposite sign transition: we call these "peaks" and the reference absolute value for detection is lower (e.g. 5) than that for edges.

So, according to the present example, the system would detect a rising edge when it is verified the following relation:

$$gl(x+6)-gl(x)>10$$

(similarly a falling edge would be identified if gl(x+6)-gl(x)<-10).

When a peak is encountered both following relations are respected:

$$gl(x+6)-gl(x)>5 \text{ AND } gl(x+6)-gl(x+12)<-5$$

Of the 5 horizontal profiles the system stores in a memory the x coordinates of the detected edge. The left most x coordinate is taken as left border of DOT.

2. The right edge of DOT is determined following a similar algorithm as for the left edge. Once we determine the left and right border, we can derive the diameter of the DOT and this value will be used in the following steps.

3. The DDA finds the bottom edge of DOT through a 7 edge scans. Through the analysis of left side and right side the DDA knows the horizontal center of DOT. So, in order to find the vertical coordinate of the center of DOT, it scans the image from y=512 to a predetermined level of the image, which in the present implementation is half height=258, but other levels could be used instead, e.g. three quarters of height: (512/4)*3=384 pixels. Finally the DDA searches for a rising edge with value over 10. This algorithm basically follows the same method steps described for left and right edges using the same functions of rising/falling edge detection (e.g. exceeding the predetermined threshold of 10gl) and peaks detection (e.g. exceeding the predetermined threshold of 5gl). At the end of the scan the system chooses the lower most Y coordinate among the 7 profiles.

Figure 8:
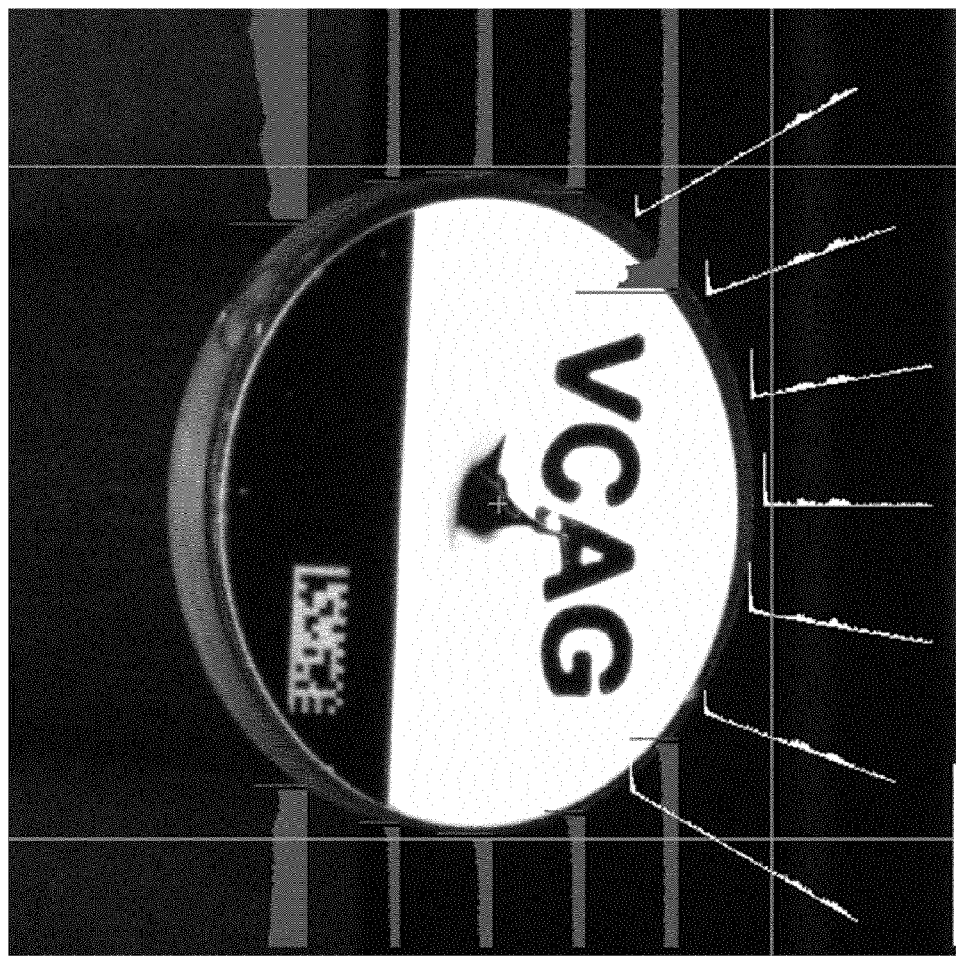

FIG. 8 shows 10 horizontal profiles (left and right profiles represented in grey) and the 7 bottom scans (represented with white lines).

With the left, right and bottom edge the system can now calculate the XY coordinates of the center of DOT and its approximate radius. Next step allows to determine all circular pointers (addresses) thanks to pre-calculated sine and cosine for subsequent analysis with the found radius. This step is performed by a CalculateRingPoints function which pre-calculates all pointers from −20° to 360+20°. This extra angulation (+/−20°) allows to intercept the DMTX when it's closed to 0° or 360°. The pre-calculation described above is a complex trick but an efficient way for saving time during subsequent image processing. The system, in order to find the position of DMTX, implements a function called RingProfileScan, which, starting from a predetermined position of the circular crown (for example EST position as 0° reference) and following a clockwise rotation, performs a radial scan along the whole profile of the circular crown using previous pre-calculated points.

As we will better see with reference to FIG. 10c (highlighted by two vertical lines), the position of DMTX inside the crown is always characterized by an area with several changes of gl values delimited by two areas with very low gl value due to the black area where DMTX is positioned (printed). The system, detecting these areas inside the black zone, is able to intercept the DTMX.

In order to perform some adjustments of the estimation of DOT position in Y axis (due for example to the presence of image noises) there is a loop that allows six scans with different circular rings (or crowns):

Crown 1: is shifted on the Y-axis of Y=(center−20 pixels);
Crown 2: is shifted on the Y-axis of Y=(center−10 pixels);
Crown 3: is centered on Y-axis
Crown 4: is shifted on the Y-axis of Y=(center+10 pixels);
Crown 5: is shifted on the Y-axis of Y=(center+20 pixels);
Crown 6: is shifted on the Y-axis of Y=(center+30 pixels);

In other words, first Crown is positioned on DOT on the determined Y coordinate (CenterY) minus 20 pixels, i.e. Y=CenterY−20; the second is positioned on Y=CenterY−10; the third on Y=CenterY; the fourth on Y=CenterY+10; the fifth on Y=CenterY+20 and the sixth on Y=CenterY+30.

Figure 9:
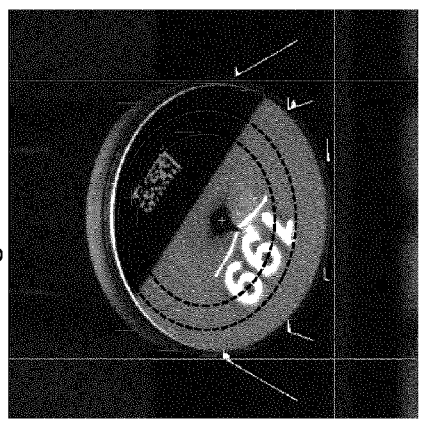
Figure 9:
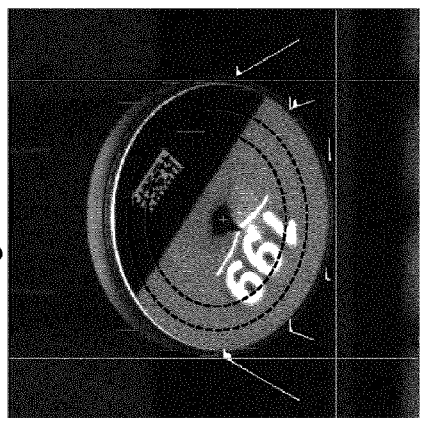
Figure 9:
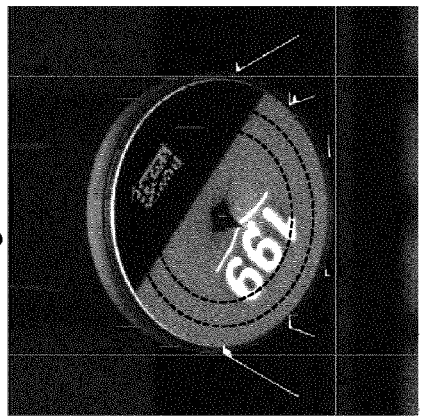
Figure 9:
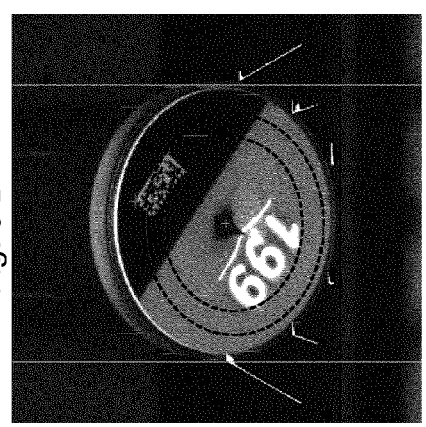
Figure 9:
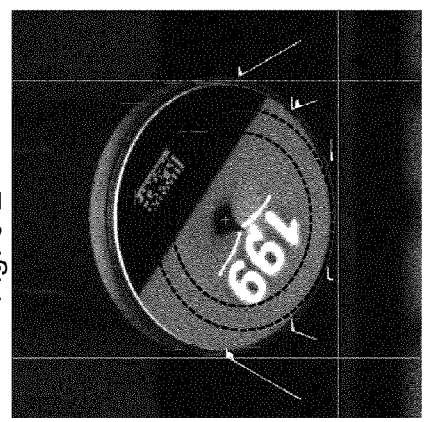
Figure 9:
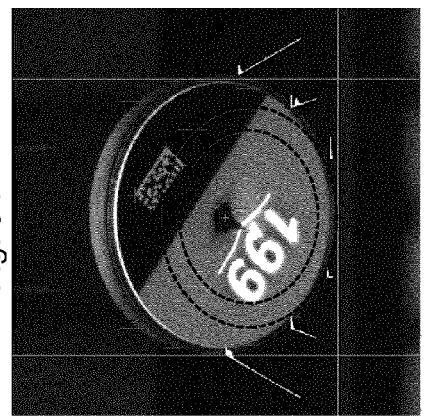

FIGS. 9A-9F show examples of crowns, while FIGS. 10A-10F graphically represent their corresponding radial profiles:

Crown 1, shown in FIG. 9A, is represented as radial profile in FIG. 10A combined with Crown 3 (FIG. 9C). Crown 1 is shown together with Crown 3 because Crown 3 has been determined by the algorithm as the best choice, i.e. the crown where more likely the Data Matrix is included.

Crown 2, shown in FIG. 9B, is represented as radial profile in FIG. 10B combined with Crown 3. Crown 2 is shown together with Crown 3 which has been determined by the algorithm as the best choice, i.e. the crown where more likely the Data Matrix is included.

Best Crown, (in this case Crown 3) as selected by the algorithm is represented in FIG. 10C and highlighted by two vertical lines.

Crown 4, shown in FIG. 9D, is represented as radial profile in FIG. 10D combined with Crown 3. Crown 4 is shown together with Crown 3 which has been determined by the algorithm as the best choice, i.e. the crown where more likely the Data Matrix is included.

Crown 5, shown in FIG. 9E, is represented as radial profile in FIG. 10E combined with Crown 3. Crown 5 is shown together with Crown 3 which has been determined by the algorithm as the best choice, i.e. the crown where more likely the Data Matrix is included.

Crown 6, shown in FIG. 9F, is represented as radial profile in FIG. 10F combined with Crown 3. Crown 6 is shown together with Crown 3 which has been determined by the algorithm as the best choice, i.e. the crown where more likely the Data Matrix is included.

The system, in order to find the position of DMTX implements a function called RingProfileAnalyze that analyzes data collected by RingProfileScan function on all six crowns. With these six scans the system can choose the best crown that is closest to DataMatrix. To select the best crown the algorithm analyzes data calculating:

accumulator of grey level of the left-base length 20 pixels (BaseSx)
accumulator of grey level of the right-base length 20 pixels (BaseDx)
accumulator of grey level of the DMTX length 46 pixels (BaseDM)

For all degrees of the radial scan the algorithm checks these conditions:
1) the accumulators BaseSx+BaseDx must be the smallest one for all 360 degrees;
2) the accumulator BaseDM must be higher than a threshold;
3) the difference between BaseSx and BaseDx must be less than a predetermined threshold, e.g. 500;
4) the accumulator BaseDM medium +0.25% must be greater than a predetermined reference value RV which is the lowest value in the black zone surrounding the DTMX detected during each crown scan profile;
5) the BaseSx and BaseDx must be less than the double of the reference value RV All above conditions allow to determine the best point corresponding to the angular coordinate where we can find the Data Matrix.

In FIG. 10C we can see how Data Matrix is placed between two dark zones (quiet-zone), has a specific height which corresponds to the contrast of white micro dots, has a specific width (about 46 points with 20 dark points on the right and on the left). When the Data Matrix is detected within the graph two vertical lines are drawn in correspondence of the best point.

Hough Transform

The purpose of the Hough transform is to perform groupings of edge points into object candidates by performing an explicit voting procedure. This voting procedure is carried out in a parameter space, from which object candidates are obtained as local maxima in a so-called accumulator space.

Figure 11:
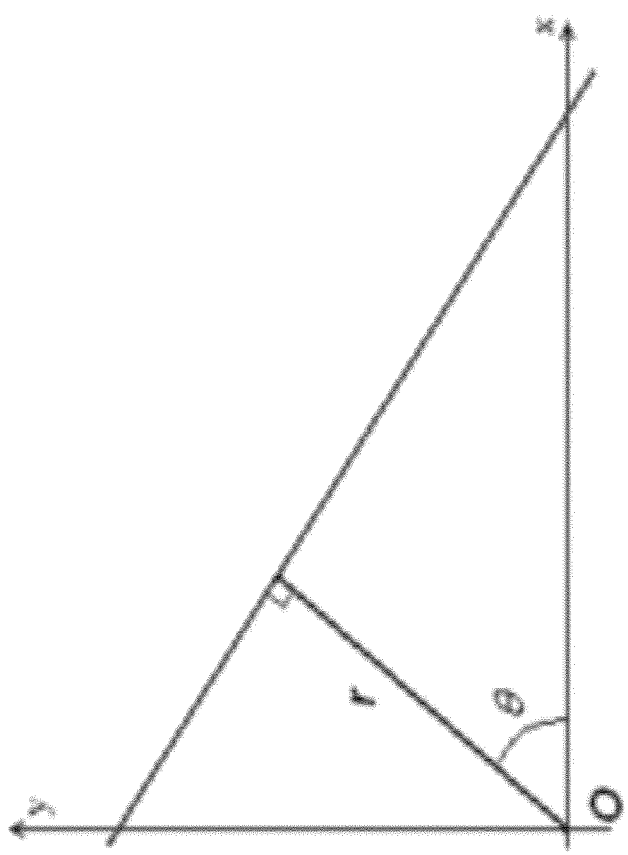

For an arbitrary point on the image plane with coordinates, e.g., $(x_0, y_0)$, the lines that go through it are:

$$r(\theta) = x_0 \cos\theta + y_0 \sin\theta,$$

where r (the distance between the line and the origin) is determined by $\theta$. This corresponds to a sinusoidal curve in the $(r,\theta)$ plane, which is unique to that point as represented in FIG. 11.

Linear Regression

Figure 12:
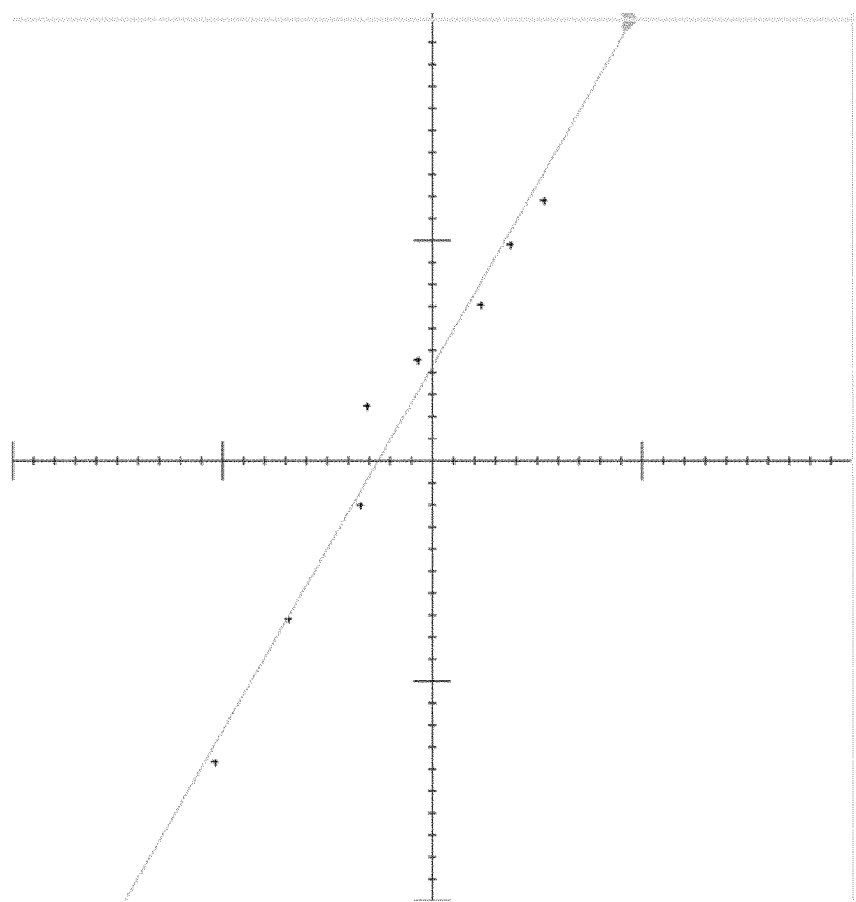

The linear regression function, also called LineFit, calculates the straight line that passes closest to all input points. FIG. 12 shows an example of line fit algorithm. The visualized points don't belong to the same straight line, but the linear regression model uses the least squares approach to calculate the best line.

Find the Begin/End of Base Line Width (BLW) and Base Line Height (BLH)

Figure 13:
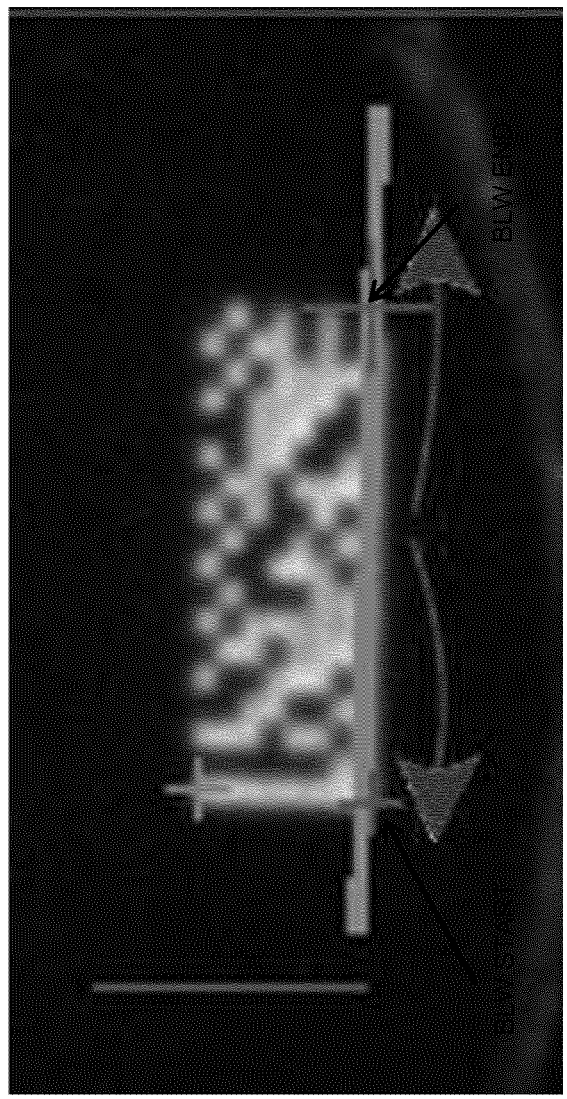

In a preferred embodiment of the present disclosure, the system, in order to increase the accuracy of the research of DMTX (e.g. the one represented in FIG. 13), implements two functions called SearchStartEndBLW and SearchStartEndBLH that find the start and stop of BLW and BLH. BaseLineWidth (BLW) and BaseLineHeight (BLH) are the two orthogonal segments which delimit rectangular DMTX and they are normally used to identify the orientation of DTMX. To successfully follow the base lines there are four tests. The first test, accepts and analyzes the BLW basically horizontal. Within this test, there is another check to find the position of DMTX. The lower quadrant (0° to 180°) or the upper quadrant (180° to 360°).

The second test accepts and analyzes the BLW basically vertical. Within this test, there is another check to find the position of DMTX. The left quadrant (90° to 270°) or the right quadrant (270° to 90°).

This function begins with a scan from the center of the BLW and goes to the external side to find where the BLW begins or finishes.

To strengthen the research of the falling edge (from white to black) the algorithm compares and sums a couple of three pixels.

After having found the best falling edge, it tries again with best accuracy through the subpixel function always following the BLW direction.

FIG. 14 shows an example to illustrate the concept above.

In the first step $X_0$ the algorithm checks if $(gl_1 - gl_2)>$threshold where:

$$gl_1 = (x_0 y_0 + x_0 y_1 + x_0 y_2) + (x_1 y_0 + x_1 y_1 + x_1 y_2) = (200+205+203)+(205+207+204)$$

$$gl_2 = (x_2 y_0 + x_2 y_1 + x_2 y_2) + (x_3 y_0 + x_3 y_1 + x_3 y_2) = (190+188+191)+(180+175+178)$$

In the second step $X_1$ the algorithm checks always $gl_1$ and $gl_2$ but begins from $X_1$, the third step begins from $X_2$, and so on . . . .

Figure 15:
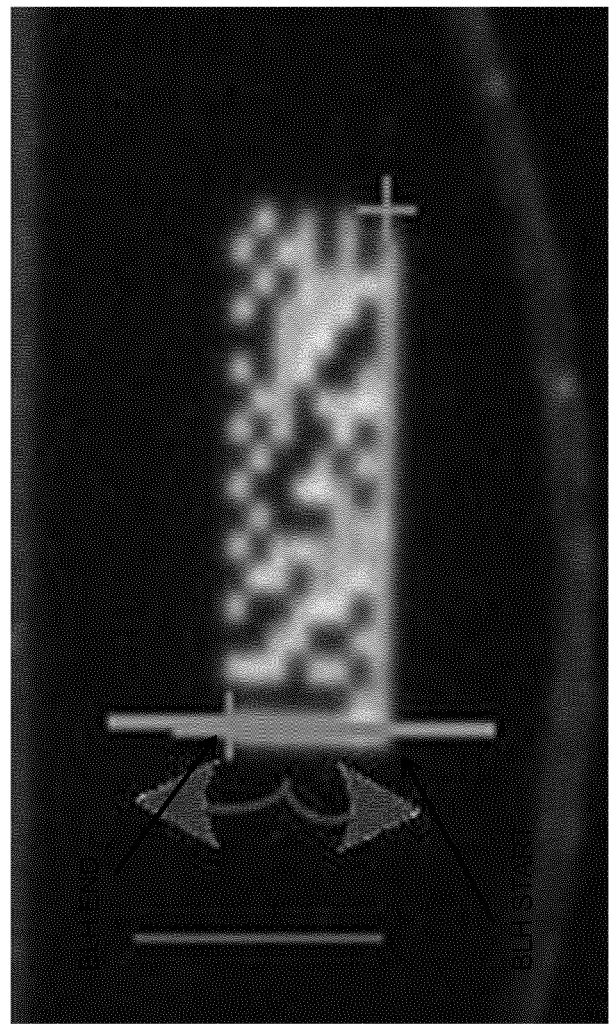

For the Base line Height the function SearchStartEndBLH finds the beginning and the end of BLH starting from the middle of points found by previous function SearchStartEndBLW. Once having found the points on the BLH, the algorithm refines the edge detection with a subpixel precision (see FIG. 15).

To strengthen the research of the falling edge (from white to black) the algorithm compares and sums a couple of three pixels value.

After having found the best falling edge, it tries again with more accuracy through subpixel function, always following the BLH direction.

Find the Clock (Timing Pattern)

In a preferred embodiment of the present disclosure, the system, in order to increase the correct interpretation of the end of BLW, implements a function called SearchParallelBLH that searches the parallel line to the BLH because it is truncated or because there is not enough gap from white to black with respect to the dark zone surrounding the DTMX.

Figure 16:
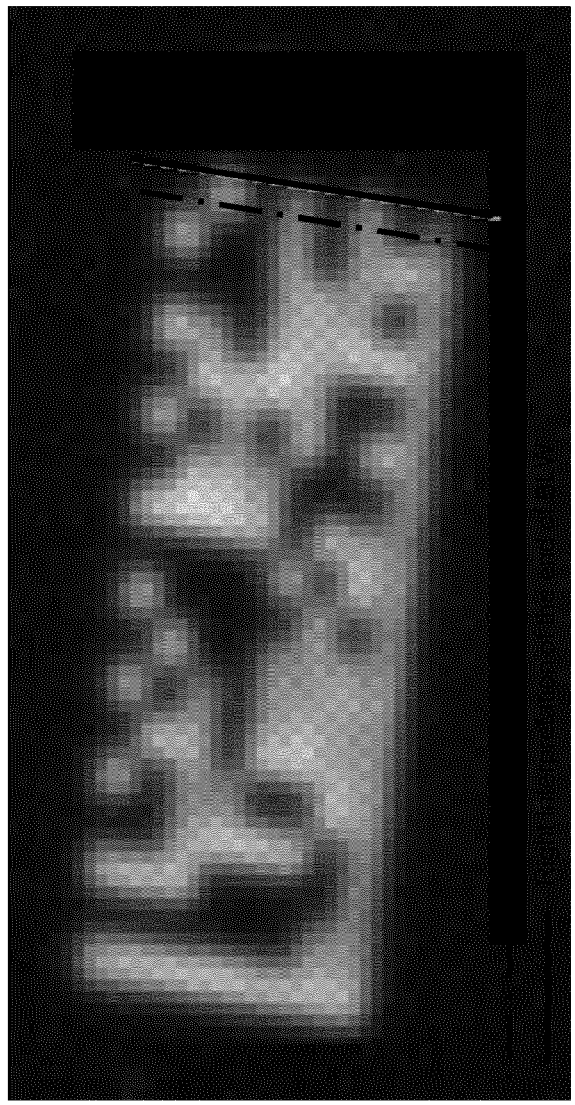
Figure 17:
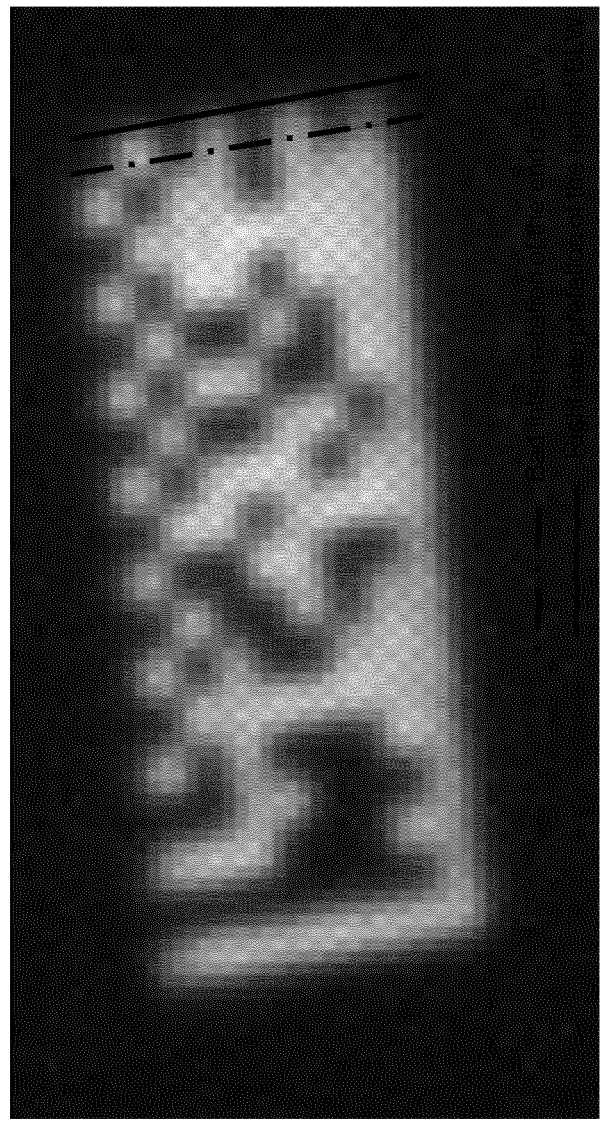

The blurred images shown in FIGS. 16 and 17 represents two examples of a bad interpretation.

The end of BLW (interpreted by the DDA) is highlighted with a broken line.

To overcome this problem there is an implemented function called SearchParallelBLH that searches the parallel line to the BLH. This procedure executes a vertical profile to correctly find the end of DMTX highlighted with a small line in the image above. So, after having found the end of the BLW the function SearchParallelBLH verifies and searches the end of DMTX. The pictures shown in FIGS. 18A, 18B and 18C represent the vertical profile in progress. FIG. 18C shows with a big grey cross the correct end of DMTX which is rightmost compared with the small grey cross (FIG. 18A, FIG. 18B).

Figure 19:
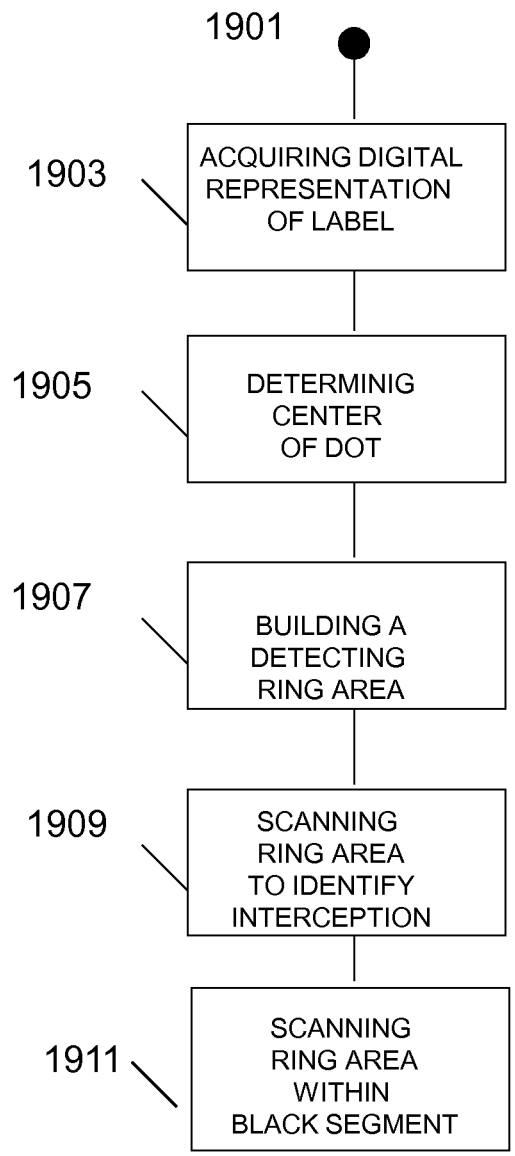
FIG. 19 shows a flow diagram of the method steps according to a preferred embodiment of the present invention.

The method described above is also represented in the diagram shown in FIG. 19. We will assume for the following example that the DataMatrix (e.g. a 2-D barcode) to be identified (and successively scanned and read) is positioned within a circular crown and a circular segment having a dark (i.e. black) background. Technically speaking this means that the minimum darkness of each pixel of a digital representation of such circular segment is higher than a predetermined threshold (i.e. it doesn't need to be really black, the system will consider it a "black" background provided all pixels are darker than such threshold). Those skilled in the art will easily appreciate that the method according to the present invention could work equally if the background is "white", i.e. if the maximum darkness of all the pixels of a digital representation of such circular segment is lower than a predetermined threshold (i.e. it doesn't need to be really white, the system will consider it a "white" background provided all pixels are lighter than such threshold). More generally, the minimum contrast between the circular segment and the rest of the substantially circular region must exceed a predetermined threshold. Other alternative embodiments are possible, e.g. there is no need that "black" background covers the whole circular segment: it could be for example a rectangle surrounding the data matrix. Even more generally it is enough that the portion of circular crown containing the data matrix can be identified by the image processing system: as an example a visual mark can be placed to indicate where the portion of the circular crown containing the data matrix (i.e. the portion to be scanned) begins. The black segment (or better the intersection of the circular crown with the chord (or secant) defining the segment) is a possible implementation of such marking. The method is performed in a digital image processing system and aims at determining the position of a rectangular data matrix within a substantially circular region (e.g. of a circular label), the data matrix being positioned within a predetermined circular crown region and within a circular segment of the substantially circular region; as mentioned above the circular segment has a background minimum darkness higher than a predetermined threshold (or lower than a predetermined threshold), the circular crown region being defined by an inner circle and by an outer circle having the center substantially coincident with the center of the substantially circular region. The method begins at black circle 1901 and then goes to 1903 where a digital representation of the circular region on the label is acquired by the system. Obviously, the label does not necessarily need to be circular; the method can work equally well with other shapes, provided a circular region with the above mentioned characteristics are included. In other words it is enough that position of the DataMatrix can be identified with reference to the center of DOT and within the circular crown and circular segment as discussed above. The system then processes the image and at step 1905 the method according to a preferred embodiment of the present invention determines the center of DOT; examples and details of the way of determining such center has been discussed above and those skilled in the art will easily appreciate that several state of the art methods and techniques can be used and combined together for such purpose. In an embodiment of the present invention determining the center of DOT includes identifying the edge of the substantially circular with an horizontal scan and a vertical scan: the horizontal scan aims at identifying a transition point where the difference between the level of gray of neighboring pixels is exceeding a predetermined value, the horizontal transition point being indicative of a lateral edge (right and/or left) of the substantially circular region; the vertical scan does the same for vertical edge (upper and/or lower edge).

At step 1907, a ring area including the DataMatrix is then identified: once the center of DOT is determined, the ring area included within an inner and an outer circle can be easily identified. Such ring area will intersect in two points the edge of the "black" (or "white", see comments above) circular sector: step 1909 of the method according to a preferred embodiment of the present invention radially scans the ring area in order to determine one of such intersections. The scan can be performed clockwise or counterclockwise: in the present example it is clockwise. At step 1911 a radial scan starting for the edge of the circular sector is performed in order to identify the edge of the DataMatrix, as explained in more details above.

Once the position of the DataMatrix on the digitally represented circular region has been determined the information carried by the DataMatrix can be read and processed with state of the art methods.

It will be appreciated that alterations and modifications may be made to the above without departing from the scope of the disclosure. Naturally, in order to satisfy local and specific requirements, a person skilled in the art may apply to the solution described above many modifications and alterations. Particularly, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements described in connection with any disclosed embodiment of the disclosure may be incorporated in any other embodiment as a general matter of design choice.

For example, similar considerations apply if the components have different structure or include equivalent units. Also, it should be easily understood by those skilled in the art that the present disclosure may be extended to any applications which needs to identify the position of a DataMatrix on a circular region, provided the DataMatrix has been positioned in a predetermined ring area (at predetermined distance from the center of the circular region) and within a circular segment. The area of the circular segment, in the examples discussed above, has been assumed to be smaller than the rest of the circular region, i.e. the area of the segment is less than 50% of the total area of the circular region. With such configuration the performances of the system are optimized, however the method of the present invention would work also with a bigger segment, covering more than half of the area of circular region.

The invention claimed is:

1. A method for determining, with a digital image processing system, the position of a rectangular data matrix within a substantially circular region, the data matrix being positioned within a predetermined portion of a circular crown region, the circular crown region being defined by an inner circle and by an outer circle having the center substantially coincident with the center of the substantially circular region, the predetermined portion of the circular crown region being identified by at least one visual mark, the method comprising:
   acquiring a digital representation of the substantially circular region;
   determining the center of the substantially circular region;
   building a detecting ring area including the inner and the outer circles;
   radially scanning the detecting ring area to identify the at least one visual mark indicative of the start position of the predetermined portion of the circular crown region; and
   starting from the start position, scanning the detecting ring area to determine the position of the border of the data matrix.

2. The method of claim 1, wherein the predetermined portion of a circular crown region is included in a circular segment, the minimum contrast between the circular segment and the rest of the substantially circular region exceeding a predetermined threshold and wherein the at least one visual mark is represented by a position where the circular crown region intersects the chord defining the circular segment.

3. The method of claim 2, wherein the area covered by the circular segment is less than 50% of the total area of the substantially circular region.

4. The method of claim 2, wherein the background of the circular segment where the data matrix is positioned is black.

5. The method of claim 1, wherein the data matrix represents a 2D barcode.

6. The method of claim 5, wherein the step of scanning the detecting ring area starting from the start position includes looking for the lateral edge of the 2D barcode.

7. The method of claim 1, wherein acquiring a digital representation includes capturing via a digital image processing system a black and white rectangular picture including the substantially circular region, the rectangular picture including an array of pixels each pixel having a level of gray and storing the representation within the digital image processing.

8. The method of claim 7, wherein the step of determining the center of the substantially circular region includes:
   identifying the edge of the substantially circular region within the rectangular picture; and
   determining the center of the substantially circular region with respect to the identified edge.

9. The method of claim 8, wherein identifying the edge of the substantially circular region includes:
   horizontally scanning the rectangular picture to identify a transition point where the difference between the level of gray of neighboring pixels is exceeding a predetermined value, the horizontal transition point being indicative of a lateral edge of the substantially circular region; and
   vertically scanning the rectangular picture to identify a transition point where the difference between the level of gray of neighboring pixels is exceeding a predetermined value, the vertical transition point being indicative of a vertical edge of the substantially circular region.

10. The method of claim 1, wherein the step of radially scanning the detecting ring area includes performing a clockwise radial scanning for an angle of more than 360°.

11. A computer-program product comprising a computer-usable medium having computer-readable program code embodied therein, the computer-readable program code adapted to be executed to implement a method of determining, with a digital image processing system, the position of a rectangular data matrix within a substantially circular region, the data matrix being positioned within a predetermined portion of a circular crown region, the circular crown region being defined by an inner circle and by an outer circle having the center substantially coincident with the center of the substantially circular region, the predetermined portion of the circular crown region being identified by at least one visual mark, the method comprising:
   acquiring a digital representation of the substantially circular region;
   determining the center of the substantially circular region;
   building a detecting ring area including the inner and the outer circles;
   radially scanning the detecting ring area to identify the at least one visual mark indicative of the start position of the predetermined portion of the circular crown region; and
   starting from the start position, scanning the detecting ring area to determine the position of the border of the data matrix.

12. A system for determining, with a digital image processing system, the position of a rectangular data matrix within a substantially circular region, the data matrix being positioned within a predetermined circular crown region and within a circular segment of the substantially circular region, the circular segment having a background minimum darkness higher than a predetermined threshold, the circular crown region being defined by an inner circle and by an outer circle having the center substantially coincident with the center of the substantially circular region, the system comprising a processor, wherein the processor is operable to implement a method comprising:
   acquiring a digital representation of the substantially circular region;
   determining the center of the substantially circular region;
   building a detecting ring area including the inner and the outer circles;
   radially scanning the detecting ring area to identify the at least one visual mark indicative of the start position of the predetermined portion of the circular crown region; and
   starting from the start position, scanning the detecting ring area to determine the position of the border of the data matrix.

* * * * *